United States Patent [19]
Eum et al.

[11] Patent Number: 6,046,831
[45] Date of Patent: Apr. 4, 2000

[54] BEAM SCANNING APPARATUS

[75] Inventors: Jae-yong Eum, Suwon; Wong-hyung Lee; Sung-min Cho, both of Seoul, all of Rep. of Korea

[73] Assignee: Samsung Electronics Co., Ltd., Kyungki-Do, Rep. of Korea

[21] Appl. No.: 09/089,394

[22] Filed: Jun. 3, 1998

[30] Foreign Application Priority Data

Jan. 26, 1998 [KR] Rep. of Korea .......................... 98-2413

[51] Int. Cl.[7] ....................................... G02B 5/32
[52] U.S. Cl. ............................. 359/18; 359/17; 359/201; 359/204
[58] Field of Search ................................ 359/17, 18, 201, 359/204

[56] References Cited

U.S. PATENT DOCUMENTS

| 4,505,537 | 3/1985 | Funato | 359/18 |
| 5,550,655 | 8/1996 | Kayashima et al. | 359/17 |
| 5,825,522 | 10/1998 | Takano et al. | 359/201 |

FOREIGN PATENT DOCUMENTS 1-142523  6/1989  Japan .

*Primary Examiner*—Cassandra Spyrou
*Assistant Examiner*—Craig Curtis
*Attorney, Agent, or Firm*—Sughrue, Mion, Zinn, Macpeak, PLLC

[57] ABSTRACT

A beam scanning apparatus includes an optical source, a beam deflector having a deflection disk which is comprised of a plurality of sectors patterned to diffract a beam emitted from the optical source and has a reflective layer for reflecting an incident beam formed on the bottom surface of the beam deflector, and a driving source for rotating the deflection disk. A beam corrector is provided for correcting the beam deflected by the beam deflector.

6 Claims, 7 Drawing Sheets

BEAM SCANNING APPARATUS

BACKGROUND OF THE INVENTION

1. Field of the Invention

The present invention relates to a beam scanning apparatus for projecting light onto a photoreceptor in a device such as an electrophotographic printer.

2. Description of the Related Art

In general, a beam scanning apparatus adopted in a printer photosensitizes a photoreceptor through a main scan by a beam deflector and a sub scan by transfer or rotation of the photoreceptor.

Referring to FIG. 1 which shows the optical arrangement of a conventional beam scanning apparatus, the beam scanning apparatus includes an optical source 1, a beam deflector 4 for deflecting a beam of light emitted from the optical source 1, and an f-theta (f-θ) lens 7 for correcting an error of light deflected by the beam deflector 4.

A condensing lens 3 is installed between the optical source 1 and the beam deflector 4 to condense the beam of light emitted from the optical source 1. The beam deflected by the beam deflector 4 is reflected by a reflective mirror 8, and the reflected beam travels toward a photoreceptor (not shown) such as a photoreceptor belt.

The beam deflector 4 is comprised of a motor 5 and a rotating polygonal mirror 6 rotated by the motor 5. The beam emitted from the optical source 1 is deflected according to the angle between the beam and a reflective plane of the rotating polygonal mirror 6. Accordingly, the beam deflection is sensitive to wobbles generated upon rotation of the rotating polygonal mirror 6.

Also, a color printer must have a special beam scanning apparatus corresponding to a specific color, thereby rendering the device complicated and large.

SUMMARY OF THE INVENTION

To solve the above problems, it is an object of the present invention to provide a compact beam scanning apparatus adopting a deflection disk instead of a rotating polygonal mirror.

Accordingly, to achieve the above object, there is provided a beam scanning apparatus comprising: an optical source for emitting a beam of light; a beam deflector having a deflection disk which includes a plurality of sectors patterned to diffract the beam emitted from the optical source and a reflective layer for reflecting an incident beam and which is formed on a bottom surface of the beam deflector, and a driving source for rotating the deflection disk; and a beam corrector which corrects the beam deflected by the beam deflector.

Each sector of the deflection disk has an incident region for receiving the beam emitted from the optical source and an emission region for emitting the beam reflected by the reflective layer, and the pattern is formed in at least one region of the incident and emission regions.

Also, it is preferable that the patterns formed in the incident region and emission region are different.

BRIEF DESCRIPTION OF THE DRAWINGS

The above object and advantages of the present invention will become more apparent by describing in detail preferred embodiments thereof with reference to the accompanying drawings, in which.

DETAILED DESCRIPTION OF THE PREFERRED EMBODIMENTS

Figure 1:
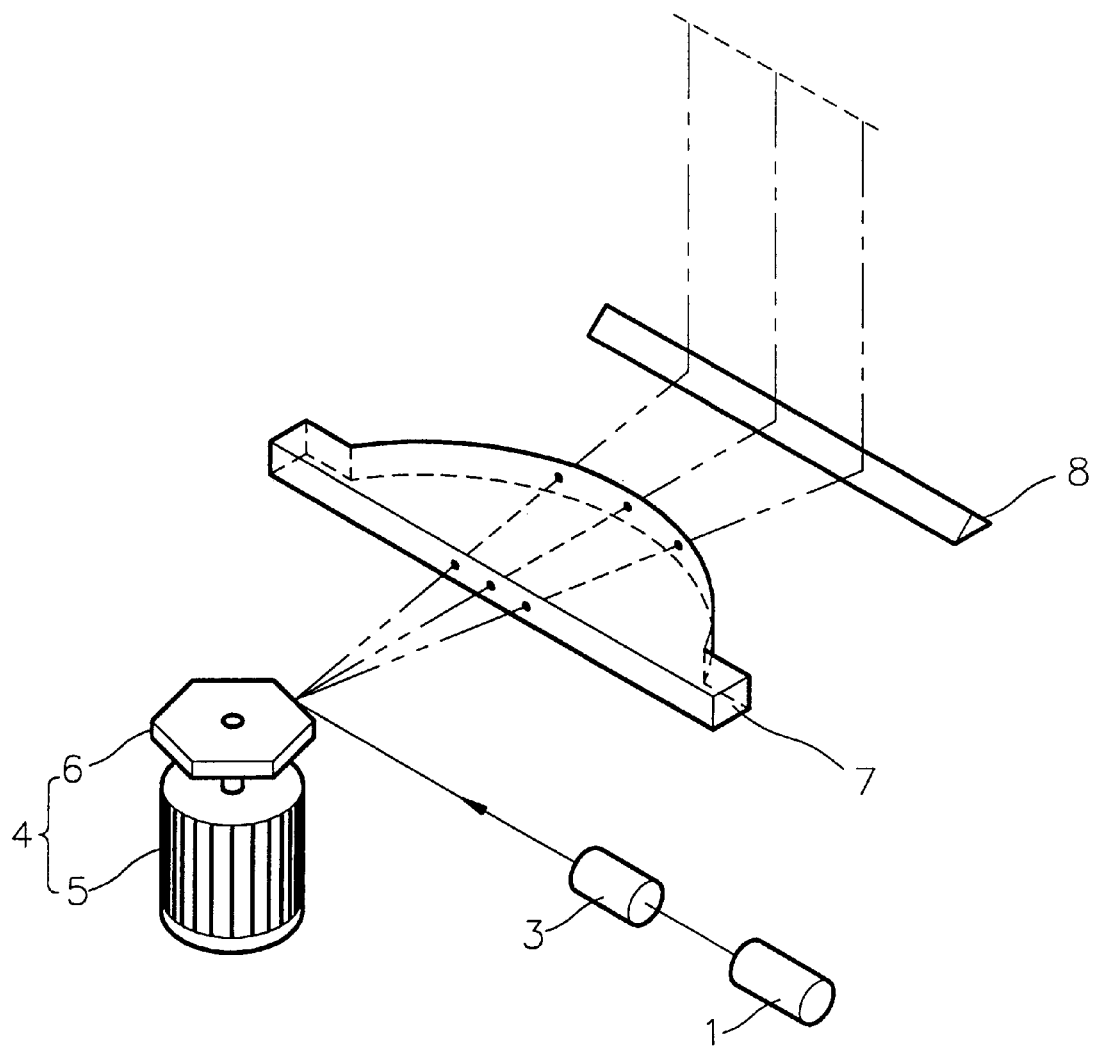
FIG. 1 is a perspective view of a conventional beam scanning apparatus.
Figure 2:
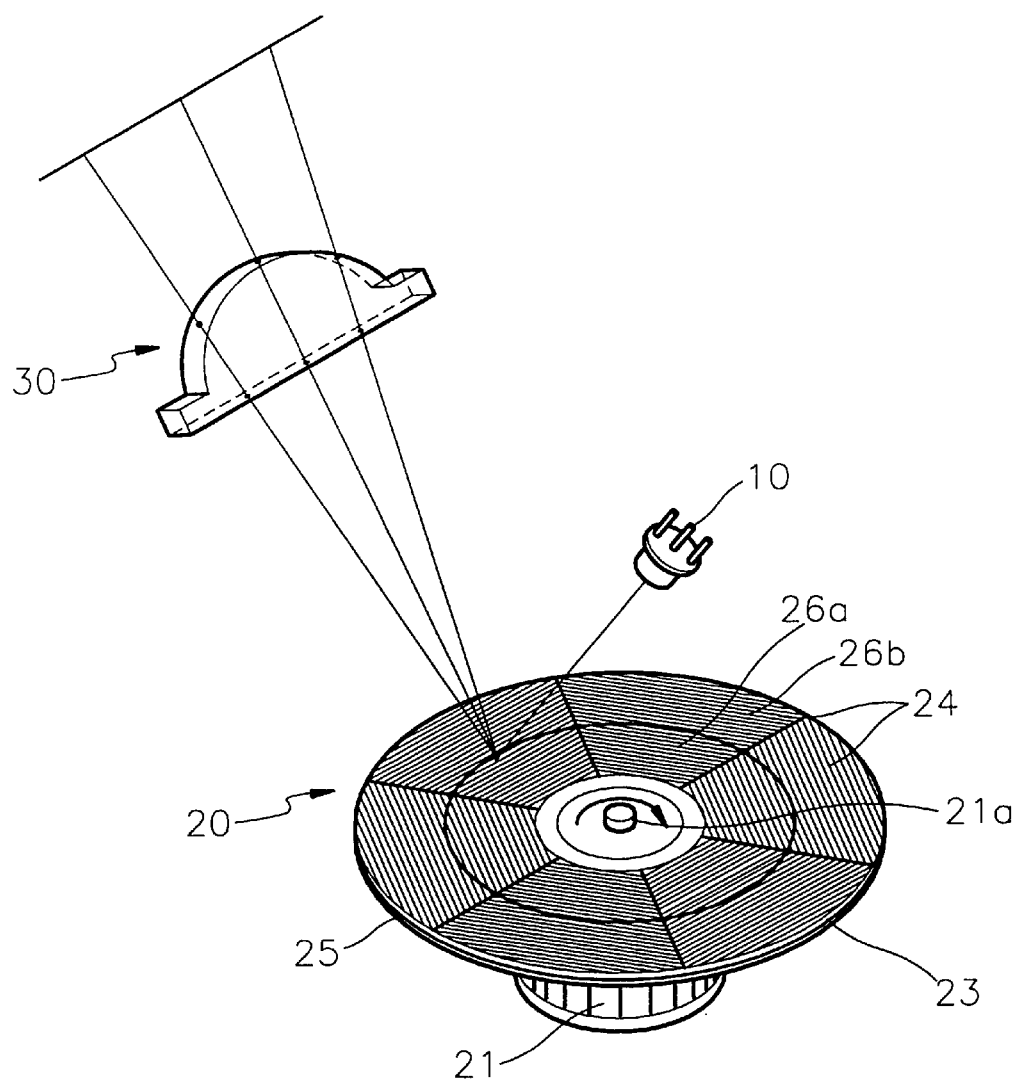
FIG. 2 is a perspective view of a beam scanning apparatus according to an embodiment of the present invention.

Referring to FIG. 2, a beam scanning apparatus according to an embodiment of the present invention is comprised of an optical source 10, a beam deflector 20 for deflecting and projecting a beam emitted from the optical source 10, and a beam corrector 30 for correcting the deflected beam.

The optical source 10 preferably comprises a semiconductor laser for emitting laser light.

The beam deflector 20 includes a driving motor 21 and a deflection disk 23 which fits on a rotation shaft 21a of the driving motor 21 and comprises a plurality of sectors 24 for diffracting and deflecting an incident beam.

The deflection disk 23 is divided into equal sectors 24. As shown in FIG. 2, each sector 24 is patterned to diffract an incident beam and deflect and project the diffracted beam in a unit of a single scan line according to the rotation of the deflection disk 23. As shown in FIG. 3B, a reflective layer 25 for reflecting an incident beam is formed on the bottom surface of the deflection disk 23.

Figure 3A:
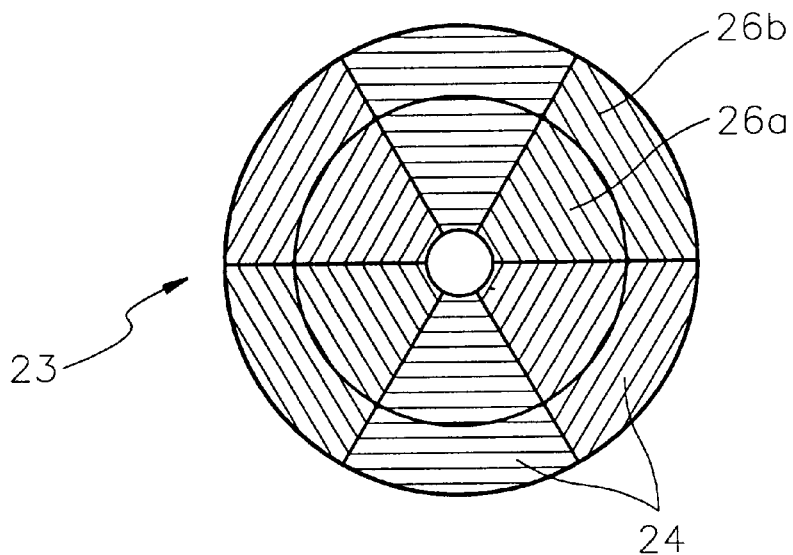
FIGS. 3A, 4A and 5A are plan views showing an example of a deflection disk adopted in a beam scanning apparatus according to the present invention.
Figure 3B:
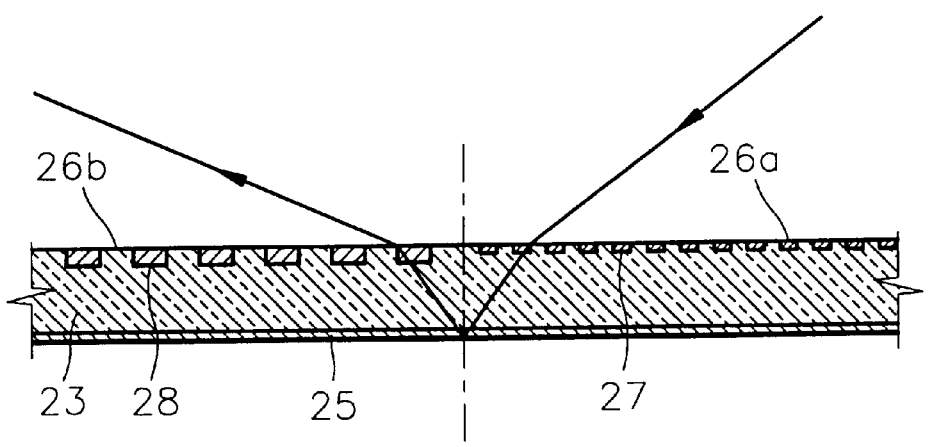
FIGS. 3B, 4B and 5B are partial, magnified views showing the same.
Figure 4A:
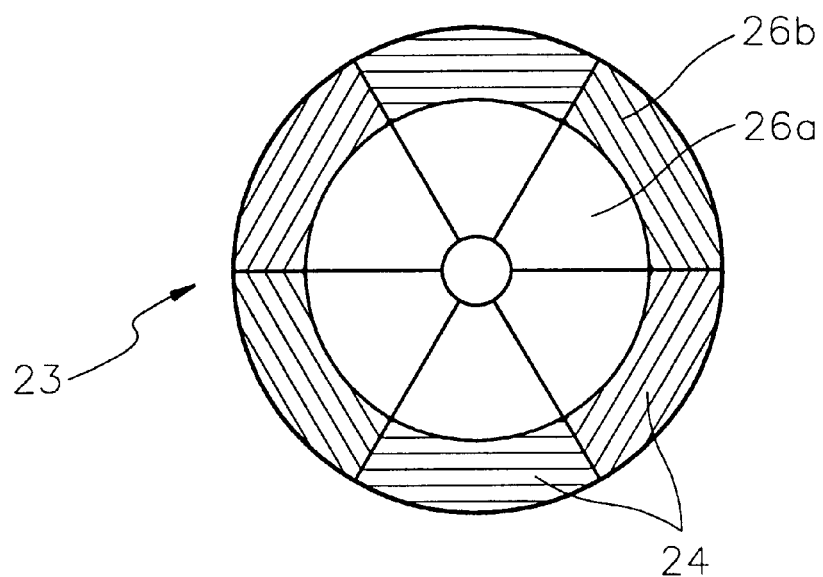
Figure 4B:
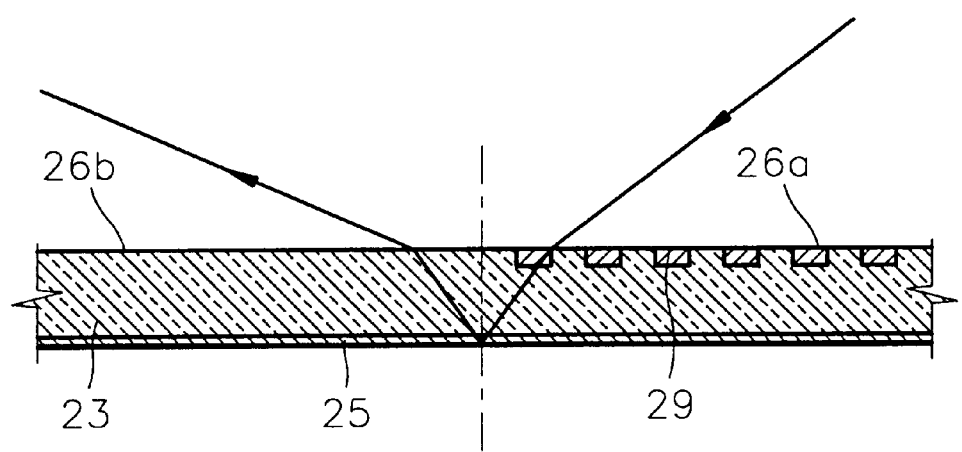
Figure 5A:
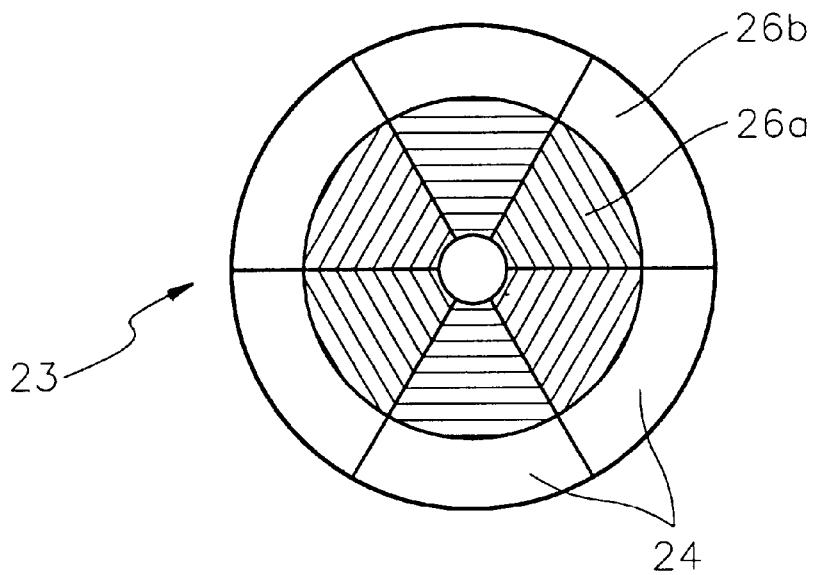
Figure 5B:
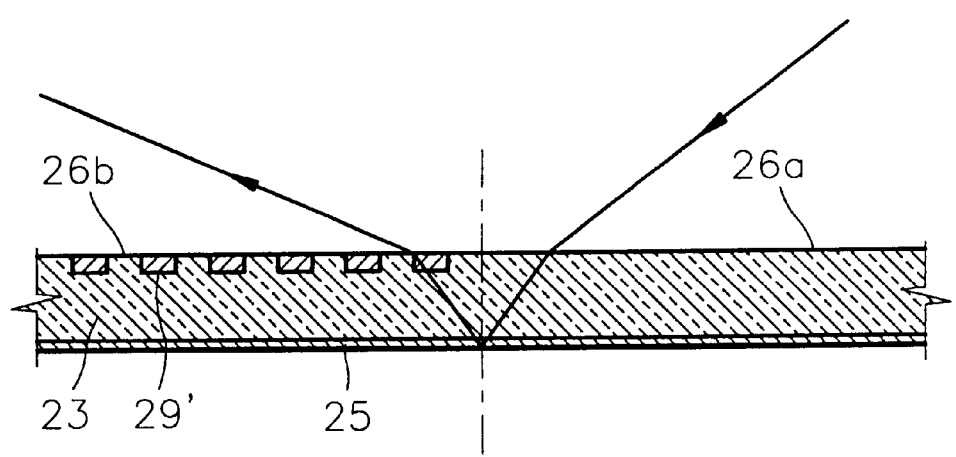

As shown in FIGS. 3A and 3B, each sector 24 is comprised of a first pattern 27 formed in an incident region 26a upon which a beam emitted from the optical source 10 is incident, and a second pattern 28 formed in an emission region 26b from which a beam reflected by the reflective layer 25 is emitted. In the present embodiment, the incident region 26a is formed within an inner diameter of the emission region 26b, but it is not limited to the above installation and may be formed outside the emission region 26b.

The first and second patterns 27 and 28 can be formed to each have a different interval pattern. In this case, the diffraction angles of an incident beam and an emitted beam with respect to the deflection disk 23 are different. That is, a beam incident upon the incident region 26a from the optical source 10 at a predetermined angle diffractedly penetrates through the first pattern 27, is reflected by the reflective layer 25, and emitted via the emission region 26b at an angle different from the angle of the incident beam.

Here, the diffraction angle, i.e., the refraction angle, of the beam diffractedly penetrated through the first and second patterns 27 and 28 can be diversely changed by the pattern intervals of the first and second patterns 27 and 28.

According to other embodiments of the present invention, as shown in FIGS. 4A and 4B and FIGS. 5A and 5B, a pattern 29 or 29' can be formed only on the emission region 26b or incident region 26a of the deflection disk 23. In this case, the incidence angle with respect to the deflection disk 23 is also different from the emission angle of a beam reflected by the reflective layer 25.

As described above, the deflection disk 23 diffracts an incident beam at least once, and deflects and projects the beam emitted from the optical source 10 in single scan line units according to its rotation.

The beam corrector 30 shown in FIG. 2 is installed in light paths and corrects the beam deflected by the beam deflector 20. An f-theta lens for correcting the focal position and a scan width of an incident beam may be used as the beam corrector 30. The f-theta lens corrects aberrations of a beam projected in a main scan direction according to the rotation of the deflection disk 23, and shapes the corrected beam.

The beam scanning apparatus can deflect and project the beam emitted from the optical source 10 into an image plane (not shown) in units of a single scan line by rotating the deflection disk 23.

Figure 6:
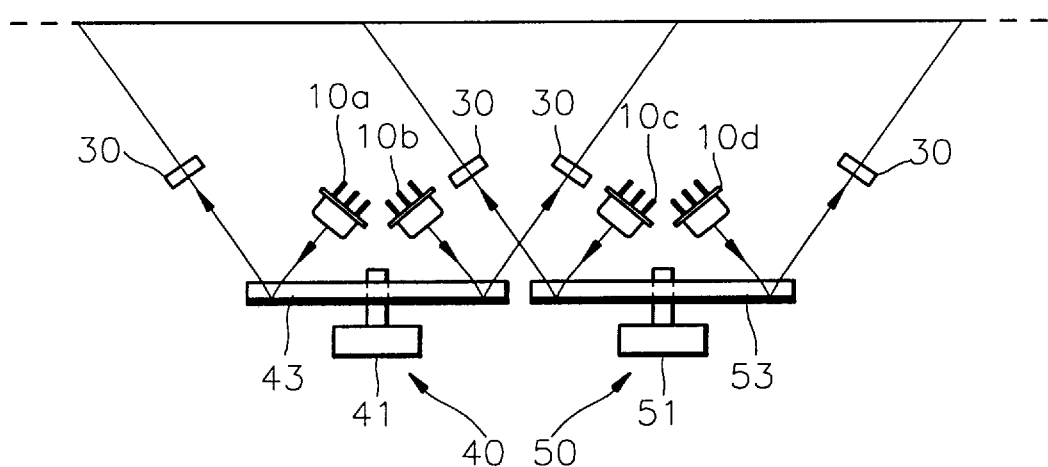
FIG. 6 is a side view of a beam scanning apparatus according to another embodiment of the present invention.

A beam scanning apparatus according to another embodiment of the present invention will be described with reference to FIG. 6. Referring to FIG. 6, the beam scanning apparatus includes at least two optical sources (in this case four are shown) 10a, 10b, 10c and 10d, first and second beam deflectors 40 and 50 for deflecting and projecting beams emitted from the optical sources 10a through 10d, and a beam corrector 30 for correcting the beams deflected by the beam deflectors 40 and 50. In this case, the same reference numerals as those in FIG. 2 denote the same members.

The optical sources 10a through 10d are each selectively driven.

The first beam deflector 40 deflects and projects the beams emitted from the optical sources 10a and 10b, and the second beam deflector 50 deflects and projects the beams emitted from the optical sources 10c and 10d. The first and second beam deflectors 40 and 50 respectively include first and second deflection disks 43 and 53 each having at least two sectors 24 (see FIG. 2) for diffracting and transmitting incident beams, and first and second driving motors 41 and 51 for rotating the first and second deflection disks 43 and 53, respectively. The structures of the first and second deflection disks 43 and 53 are the same as those in the previous embodiment.

The optical sources 10a through 10d are disposed to allow beams emitted therefrom to be incident upon the different sectors 24 of the first and second deflection disks 43 and 53. That is, the beams emitted from the optical sources 10a and 10b are incident upon and reflected by the different sectors of the first deflection disk 43, and the beams emitted from the optical sources 10c and 10d are incident upon and reflected by the different sectors of the second deflection disk 53.

The beams emitted from the optical sources 10a through 10d form different scan lines on the image plane (not shown) by rotating the first and second deflection disks 43 and 53. Thus, at least two beams can be projected simultaneously.

Figure 7:
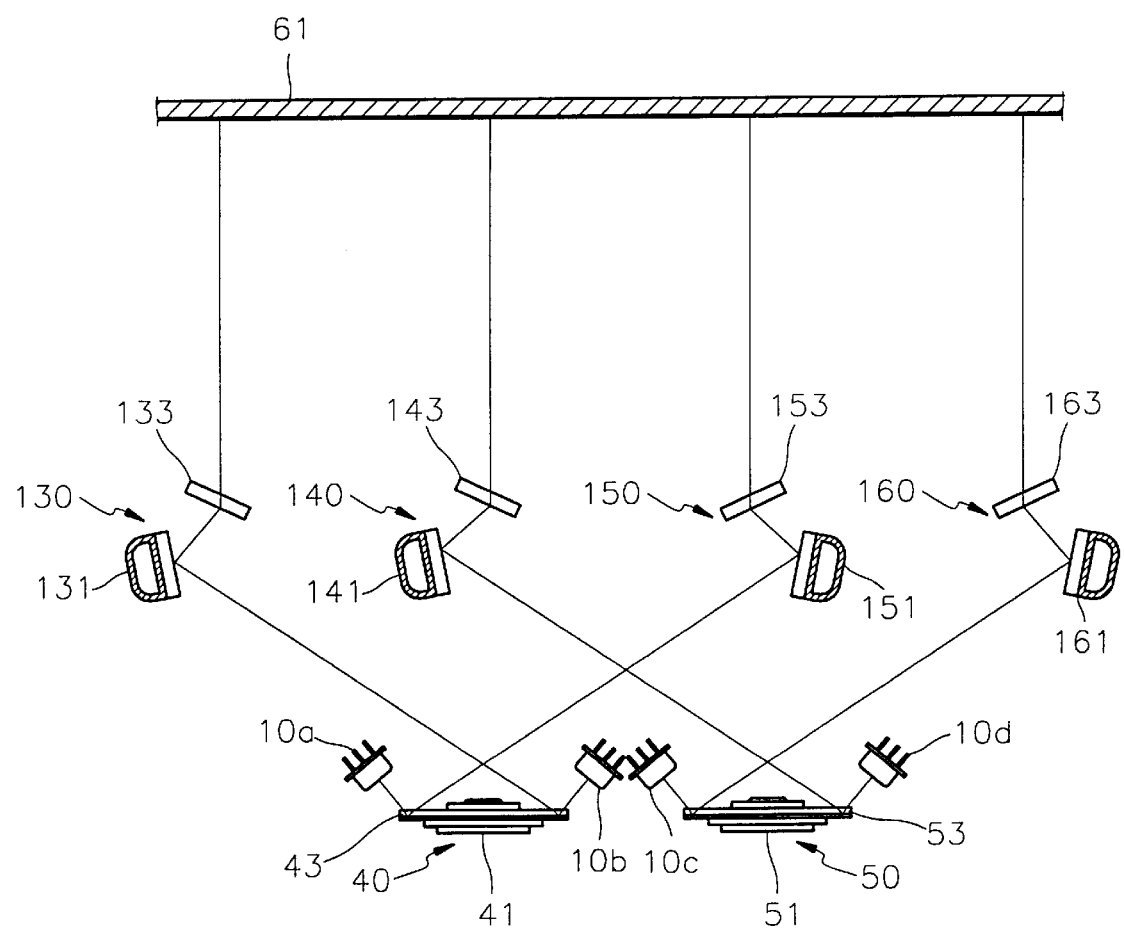
FIG. 7 is a side view of a beam scanning apparatus according to a still further embodiment of the present invention.

Referring to FIG. 7 showing still another embodiment of the present invention, the beams emitted from the optical sources 10a through 10d are reflected by the first and second beam deflectors 40 and 50, and projected onto a photoreceptor 61 such as a photoreceptor belt via beam correctors 130, 140, 150 and 160. In this case, the same reference numerals as those in FIG. 6 denote the same members.

The beam correctors 130, 140, 150 and 160 are installed on light paths, and correct aberrations of beams deflected in the main scan direction upon rotation of the first and second deflection disks 43 and 53, and shape the corrected beams. The beam correctors 130, 140, 150 and 160 include reflective members 131, 141, 151 and 161, respectively, for condensing and reflecting incident beams, and hologram elements 133, 143, 153 and 163, respectively, for diffracting and transmitting beams reflected by the reflective members 131, 141, 151 and 161.

Preferably, the reflective members 131, 141, 151 and 161 are curved mirrors capable of condensing parallel beams. The hologram elements 133, 143, 153 and 163 diffract and transmit the beams reflected by the reflective members 131, 141, 151 and 161 in a sub scan direction of the photoreceptor 61, i.e., in a direction perpendicular to the operation direction of the photoreceptor 61.

The beam scanning apparatus according to the present invention adopts a reflective type deflection disk as a beam deflection unit, so that its volume is small and space for installing optical sources is reduced. Also, the beam scanning apparatus can deflect and project beams emitted from at least two optical sources together. Furthermore, the beam scanning apparatus adopts a deflection disk for diffracting and reflecting incident beams, so that deflected beams can be more stably projected than in a conventional rotating polygonal mirror method.

It is contemplated that numerous modifications may be made to the beam scanning apparatus of the present invention without departing from the spirit and scope of the invention as defined in the following claims.

What is claimed is:

1. A beam scanning apparatus comprising:
   an optical source for emitting a beam of light;
   a beam deflector having a deflection disk which includes a plurality of sectors patterned to diffract the beam emitted from the optical source and a reflective layer for reflecting an incident beam and which is formed on a bottom surface of the beam deflector, and a driving source for rotating the deflection disk; and
   a beam corrector which corrects the beam deflected by the beam deflector,
   wherein each sector of the deflection disk has an incident region for receiving the beam emitted from the optical source and an emission region for emitting the beam reflected by the reflective layer, and the patterns are formed in the incident and emission regions, and
   wherein the patterns formed in the incident region and emission region are different.

2. The beam scanning apparatus as claimed in claim 1, wherein the incident region is formed inside an inner diameter of the emission region of the deflection disk.

3. The beam scanning apparatus as claimed in claim 1, wherein the optical source comprises a plurality of optical sources for emitting beams onto different sectors of the deflection disk.

4. The beam scanning apparatus as claimed in claim 3, further comprising an additional deflection disk installed side by side with respect to the deflection disk, and the optical source comprises two optical sources for emitting beams onto different sectors of the deflection disk, and two optical sources for emitting beams onto different sectors of the additional deflection disk.

5. The beam scanning apparatus as claimed in claim 1, wherein the beam corrector includes an f-theta (f-θ) lens installed in a light path so as to correct a focal position and a scan width of the beam deflected by the beam deflector.

6. A beam scanning apparatus comprising:

an optical source for emitting a beam of light;

a beam deflector having a deflection disk which includes a plurality of sectors patterned to diffract the beam emitted from the optical source and a reflective layer for reflecting an incident beam and which is formed on a bottom surface of the beam deflector, and a driving source for rotating the deflection disk; and a beam corrector which corrects the beam deflected by the beam deflector, wherein the beam corrector comprises:

a reflective member installed in a light path so as to condense and reflect the beam deflected by the beam deflector; and a hologram element for diffracting and transmitting a beam reflected by the reflective member.

* * * * *